United States Patent
Maddox et al.

(10) Patent No.: US 11,099,370 B2
(45) Date of Patent: Aug. 24, 2021

(54) TILTED ILLUMINATION SYSTEMS FOR FLUORESCENCE MICROSCOPES

(71) Applicant: The University of North Carolina at Chapel Hill, Chapel Hill, NC (US)

(72) Inventors: Paul Samuel Maddox, Chapel Hill, NC (US); Tanner Christian Fadero, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 185 days.

(21) Appl. No.: 16/328,710

(22) PCT Filed: Sep. 11, 2017

(86) PCT No.: PCT/US2017/050914
§ 371 (c)(1),
(2) Date: Feb. 26, 2019

(87) PCT Pub. No.: WO2018/049306
PCT Pub. Date: Mar. 15, 2018

(65) Prior Publication Data
US 2019/0196167 A1 Jun. 27, 2019

Related U.S. Application Data

(60) Provisional application No. 62/385,460, filed on Sep. 9, 2016.

(51) Int. Cl.
*G02B 21/16* (2006.01)
*G01N 21/64* (2006.01)
(Continued)

(52) U.S. Cl.
CPC ......... *G02B 21/16* (2013.01); *G01N 21/6458* (2013.01); *G02B 3/06* (2013.01);
(Continued)

(58) Field of Classification Search
CPC ................ G02B 21/16; G02B 21/0032; G02B 21/0076; G02B 21/02; G02B 21/08; G02B 3/06; G01N 21/6458; G01N 2021/6478
(Continued)

(56) References Cited

U.S. PATENT DOCUMENTS 5,293,269 A * 3/1994 Burkhart ............... C03B 23/047
359/710
5,644,400 A 7/1997 Mundt
(Continued)

FOREIGN PATENT DOCUMENTS

DE 10 2014 118 025 A1 6/2016
JP 2002-506203 A 2/2002
(Continued)

OTHER PUBLICATIONS

Communication of European publication number and information on the application of Article 67(3) for European Application Serial No. 17849706.1 (dated May 29, 2019).
(Continued)

*Primary Examiner* — Kristina M Deherrera
(74) *Attorney, Agent, or Firm* — Jenkins, Wilson, Taylor & Hunt, P.A.

(57) ABSTRACT

This specification describes methods for imaging a sample using fluorescence microscopy, systems for imaging a sample using fluorescence microscopy, and illumination systems for fluorescence microscopes. In some examples, a system includes a cylindrical lens shaped to form a light sheet from a collimated light beam at a focal line of the cylindrical lens, a photomask shaped for elongating a diffraction limited length of the light sheet by creating an interference pattern at the cylindrical lens focal line, and a structure for tilting the cylindrical lens and the photomask relative to an imaging axis of objective lens so that a
(Continued)

propagation axis of the collimated light beam is at an oblique angle relative to the imaging axis of the objective lens for tilted illumination of a sample.

15 Claims, 17 Drawing Sheets

(51) Int. Cl.
  *G02B 3/06* (2006.01)
  *G02B 21/00* (2006.01)
  *G02B 21/02* (2006.01)
  *G02B 21/08* (2006.01)

(52) U.S. Cl.
  CPC ..... *G02B 21/0032* (2013.01); *G02B 21/0076* (2013.01); *G02B 21/02* (2013.01); *G02B 21/08* (2013.01); *G01N 2021/6478* (2013.01)

(58) Field of Classification Search
  USPC ........................................... 359/385
  See application file for complete search history.

(56) References Cited

U.S. PATENT DOCUMENTS

| | | | |
|---|---|---|---|
| 2003/0137725 A1* | 7/2003 | Mueller | G02B 21/088 359/386 |
| 2005/0174568 A1 | 8/2005 | Vaez-Iravani et al. | |
| 2006/0239404 A1 | 10/2006 | Udpa et al. | |
| 2007/0109633 A1 | 5/2007 | Stelzer | |
| 2007/0153368 A1 | 7/2007 | Vucinic et al. | |
| 2009/0296087 A1 | 12/2009 | Dyshkant et al. | |
| 2010/0309566 A1 | 12/2010 | DeWitt et al. | |
| 2015/0098126 A1 | 4/2015 | Keller et al. | |
| 2015/0286042 A1 | 10/2015 | Hilbert et al. | |
| 2016/0139394 A1 | 5/2016 | Taniguchi et al. | |
| 2021/0011269 A1 | 1/2021 | Maddox et al. | |
| 2021/0033841 A1 | 2/2021 | Maddox et al. | |

FOREIGN PATENT DOCUMENTS

| | | |
|---|---|---|
| JP | 2015-537236 A | 12/2015 |
| WO | WO 97/12226 | 4/1997 |
| WO | WO 01/61324 A1 | 8/2001 |
| WO | WO 2015/155027 A1 | 10/2015 |
| WO | WO 2019/178090 A1 | 9/2019 |
| WO | WO 2019/178093 A1 | 9/2019 |

OTHER PUBLICATIONS

Golub et al., "Toward the optical "magic carpet": reducing the divergence of a light sheet below the diffraction limit," Optics Letters, vol. 40, No. 21, pp. 5121-5124 (Nov. 1, 2015).
International Search Report and Written Opinion of the International Searching Authority for International Application Serial No. PCT/US2017/050914 (dated Dec. 28, 2017).
Notification of Transmittal of the International Search Report and the Written Opinion of the International Searching Authority, or the Declaration for International Application Serial No. PCT/US2019/021839 (dated Jun. 26, 2019).
Notification of Transmittal of the International Search Report and the Written Opinion of the International Searching Authority, or the Declaration for International Application No. PCT/US2019/021842 (dated Mar. 12, 2019).
Fadero et al., "LITE microscopy: Tilted light-sheet excitation of model organisms offers high resolution and low photobleaching," Journal of Cell Biology, pp. 1-14 (Feb. 28, 2018).
Chen et al., "Lattice light-sheet microscopy: Imaging molecules to embryos at high spatiotemporal resolution," Science, vol. 346, Issue 6208, pp. 13 pages (Oct. 24, 2014).
Huisken et al., "Even fluorescence excitation by multidirectional selective plane illumination microscopy (mSPIM)," Optics Letters, vol. 32, No. 17, pp. 2608-2610 (Sep. 1, 2007).
Hell et al., "Confocal microscopy with an increased detection aperture: type-B 4Pi confocal microscopy," Optics Letters, vol. 19, No. 3, pp. 1-4 (Feb. 1, 1994).
Office Action for Canadian Application Serial No. 3,035,788 (dated Apr. 8, 2020).
Extended European Search Report for European Application Serial No. 17849706.1 (dated Apr. 7, 2020).
First Office Action for Japanese Patent Application Serial No. 2019-513848 (dated Jan. 12, 2021).
Golub, I., et al., "Toward the optical "magic carpet": reducing the divergence of a light sheet below the diffraction limit," Optics Letters, vol. 40., No. 21, pp. 5121-5124 (Nov. 1, 2015).
Office Action for Canadian Patent Application Serial No. 3,035,788 (dated Feb. 2, 2021).
Decision for Rejection for Japanese Patent Application No. 2019-513848 (dated Jul. 6, 2021).

* cited by examiner

FIG. 14C

TILTED ILLUMINATION SYSTEMS FOR FLUORESCENCE MICROSCOPES

PRIORITY CLAIM

This application claims the benefit of U.S. Provisional Patent Application Ser. No. 62/385,460 filed Sep. 9, 2016, the disclosure of which is incorporated herein by reference in its entirety.

TECHNICAL FIELD

This specification relates generally to fluorescence microscopes and more particularly to tilted illumination systems for fluorescence microscopes.

BACKGROUND

The fluorescence microscope has become the modern-day cell biologist's Swiss Army knife. With it, biologists are able to visualize and measure the dynamics of intra- and intercellular structures. Conventionally, high intensity, monochromatic light illuminates the sample through the objective lens, exciting fluorophores within the cone of light emanating from the lens. The fluorophores emit light (through a well-described mechanism) that is collected by the objective lens and transmitted, though filters that eliminate the exciting light, to the detector. A disadvantage of this "epi-illumination" geometry is light emitted from fluorophores outside the focal plane contributes to the image, confounding the focal information. The advent of confocal microscopy several decades ago mitigated this problem by eliminating out-of-focus light thought the use of pinholes. A problem remained in that high intensity excitation light is required, regardless of the epi- or confocal illumination. High intensities transmit very high energies to the biological samples, in turn creating damage to both tissues (phototoxicity) and to the fluorophores themselves (photobleaching). Photobleaching and phototoxicity are two chemically interconnected phenomena; thus, reducing one in turn reduces the other.

Light Sheet Microscopy (LSM) uses partial illumination of the sample as a solution to the problem of excitation-based photo-damage. In the over 15 year existence of LSM, various implementations have arisen, all based on the use of two objective type lens elements arranged orthogonally to 1) illuminate the sample with a sheet of light and 2) position the detection focus on the illuminating sheet. This geometry requires, in general, complex sample mounting conditions and the use of low numerical aperture (NA) detection objective lens with long enough working distance to image the illuminating sheet. The net effect of LSM is reduced or absent out-of-focus excitation; therefore, there is higher signal-to-noise for fluorophores in the focal plane. This higher signal-to-noise permits the use of lower excitation energies, thus reducing the photo-damage incurred in conventional optical geometries. These features allow ultra-high temporal resolution (30 frames per second or faster) and significantly longer imaging periods (several 1000 exposures without damage) than any other mode of fluorescence microscopy.

These benefits are not without costs; the geometry of imaging requires that the sample be held in place at the intersection of the illuminating and detection objective lenses; a position minimally 1 mm from the front elements of the lenses. The relatively low NA required to meet these criteria limit the native resolution of LSM images. Often, images require reassembly via computational means after acquisition, resulting in some pixel interpolation. One instrument has overcome these issues somewhat by using high NA objectives and conventional acquisition; however, this technology requires precision positioning of a micromirror adjacent to the sample coupled to very accurate beam steering.

Accordingly, there exists a need to build upon the current available designs for LSM in order to make this type of microscope more user-friendly to the average wet-lab biologist.

SUMMARY

This specification describes methods for imaging a sample using fluorescence microscopy, systems for imaging a sample using fluorescence microscopy, and illumination systems for fluorescence microscopes. The illuminations systems can take advantage of existing high numerical aperture (NA) (1.4 or greater) objectives by using a tilted sheet with an extended field of view generated by an interference pattern. This light sheet microscope can use Laterally Interfering, Tilted Excitation to image biological fluorophores in vivo; thus, the microscope can in some cases be referred to as the LITE microscope. LITE provides native diffraction-limited resolution (as defined by the NA of the objective), is compatible with aqueous mounting conditions, and can be implemented on existing upright or inverted microscope stands. LITE requires no image reconstitution, although images can be deconvolved to increase resolution. The LITE microscope allows biologists imaging on the coverslip surface to benefit from the low photo-damage characteristics of LSM.

In some examples, a system includes a cylindrical lens shaped to form a light sheet from a collimated light beam at a focal line of the cylindrical lens, a photomask shaped for elongating a diffraction limited length of the light sheet by creating an interference pattern at the cylindrical lens focal line, and a structure for tilting the cylindrical lens and the photomask relative to an imaging axis of objective lens so that a propagation axis of the collimated light beam is at an oblique angle relative to the imaging axis of the objective lens for tilted illumination of a sample.

In some examples, a method includes orienting a collimated illuminator and a cylindrical lens to propagate a collimated light beam from the collimated illuminator along a propagation axis and to contact a curved side of the cylindrical lens to form a light sheet at a focal line of the cylindrical lens. The method includes tilting the collimated illuminator and the cylindrical lens relative to an objective lens so that the propagation axis of the collimated light beam is at an oblique angle relative to an imaging axis of the objective lens. The method includes illuminating a sample using the light sheet. The method includes imaging the sample through the objective lens.

In some examples, an illumination system includes a cylindrical lens shaped to form a light sheet from a collimated light beam at a focal line of the cylindrical lens; a photomask shaped for elongating a diffraction limited length of the light sheet by creating an interference pattern at the cylindrical lens focal line; and a structure for tilting the cylindrical lens and the photomask relative to an imaging axis of objective lens so that a propagation axis of the collimated light beam is at an oblique angle relative to the imaging axis of the objective lens for tilted illumination of a sample.

BRIEF DESCRIPTION OF THE DRAWINGS

FIGS. 14A-C illustrate an example mounting chamber; and

DESCRIPTION

This specification describes methods for imaging a sample using fluorescence microscopy, systems for imaging a sample using fluorescence microscopy, and illumination systems for fluorescence microscopes. The following discussion describes a study performed on some methods and systems and provides further examples and details regarding the methods and system for imaging samples using fluorescence microscopy.

Figure 1:
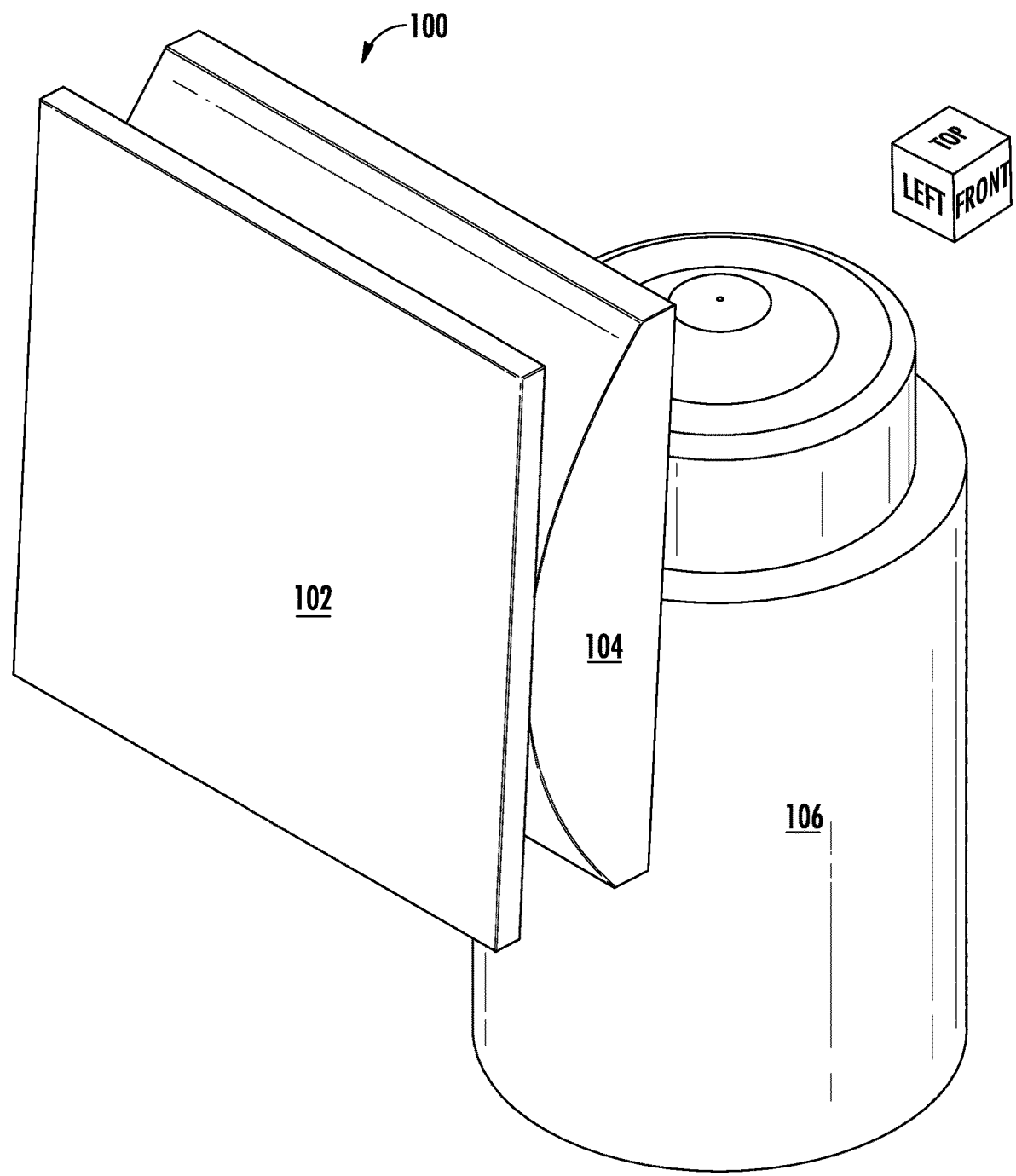
FIG. 1 illustrates an example LITE sheet generation apparatus shown from an isometric angle.

FIG. 1 illustrates an example LITE sheet generation apparatus 100 shown from an isometric angle. The apparatus 100 includes a photomask 102 placed directly adjacent to a 50-mm aspheric cylindrical lens 104. FIG. 1 illustrates the apparatus 100 in a system including a microscopic imaging objective 106 placed, in an example placement, relative to the sheet generating apparatus 100. For example, the objective 106 may be a Nikon 60×WI 1.20 NA objective with a working distance of 0.17 mm.

Figure 2:
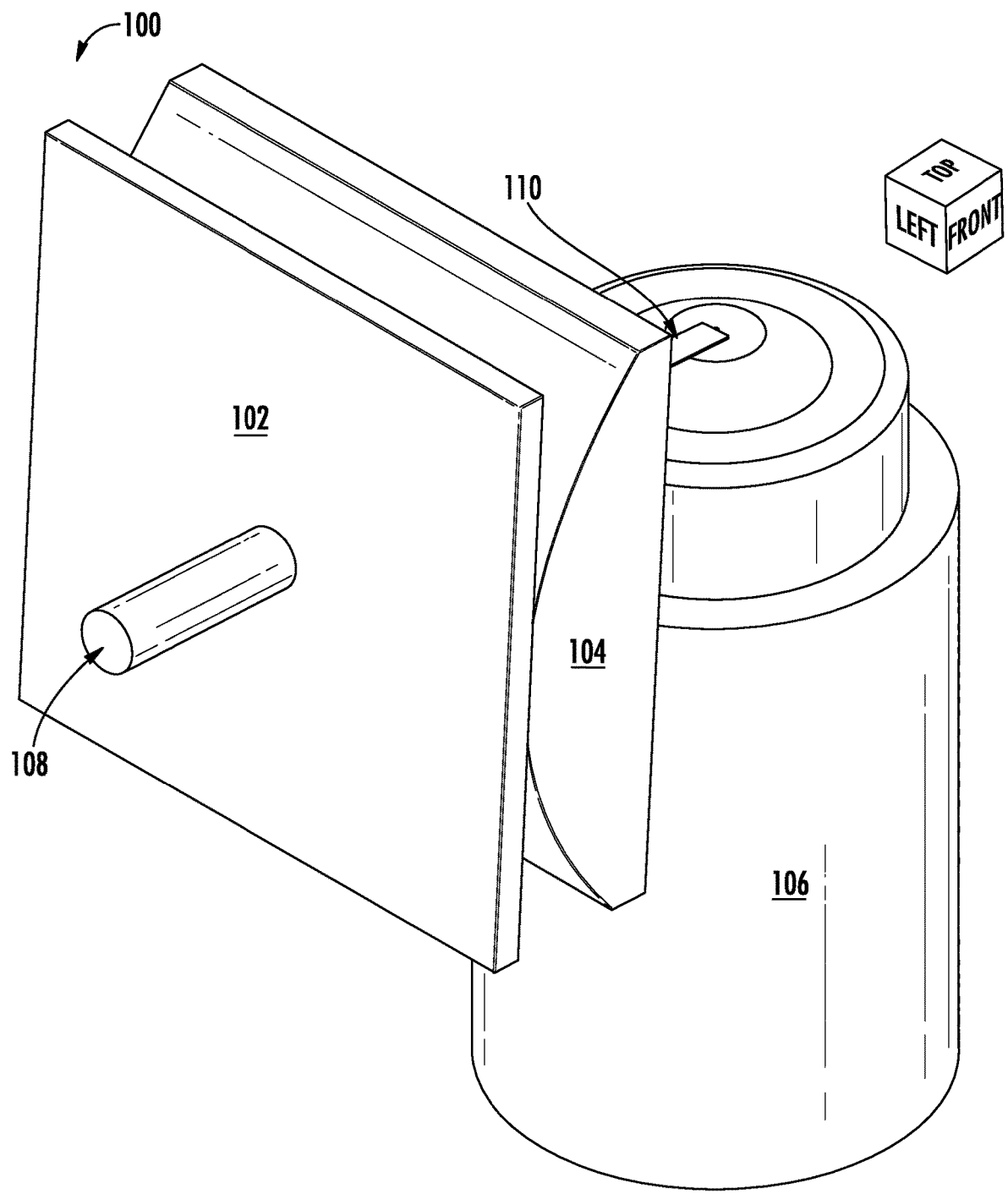
FIG. 2 illustrates the system with the inclusion of an incident collimated laser and a focused laser that is generated after passing through the apparatus.

FIG. 2 illustrates the system with the inclusion of an incident collimated laser 108 and a focused laser 110 that is generated after passing through the apparatus 100. The laser 108 is a collimated, coherent, radially symmetric laser (of variable wavelength) with a gaussian intensity profile that propagates at an angle of 180° to the plane vector of the photomask 102. Generally, the laser 108 must have a $1/e^2$ width that is greater than the separation of the outer photomask slits in the photomask 102; in this specific case, the laser 108 has a $1/e^2$ width of 5.2 mm and a wavelength of 488 nm. The photomask dimensions for this specific example are discussed further with reference to FIG. 4.

Figure 3:
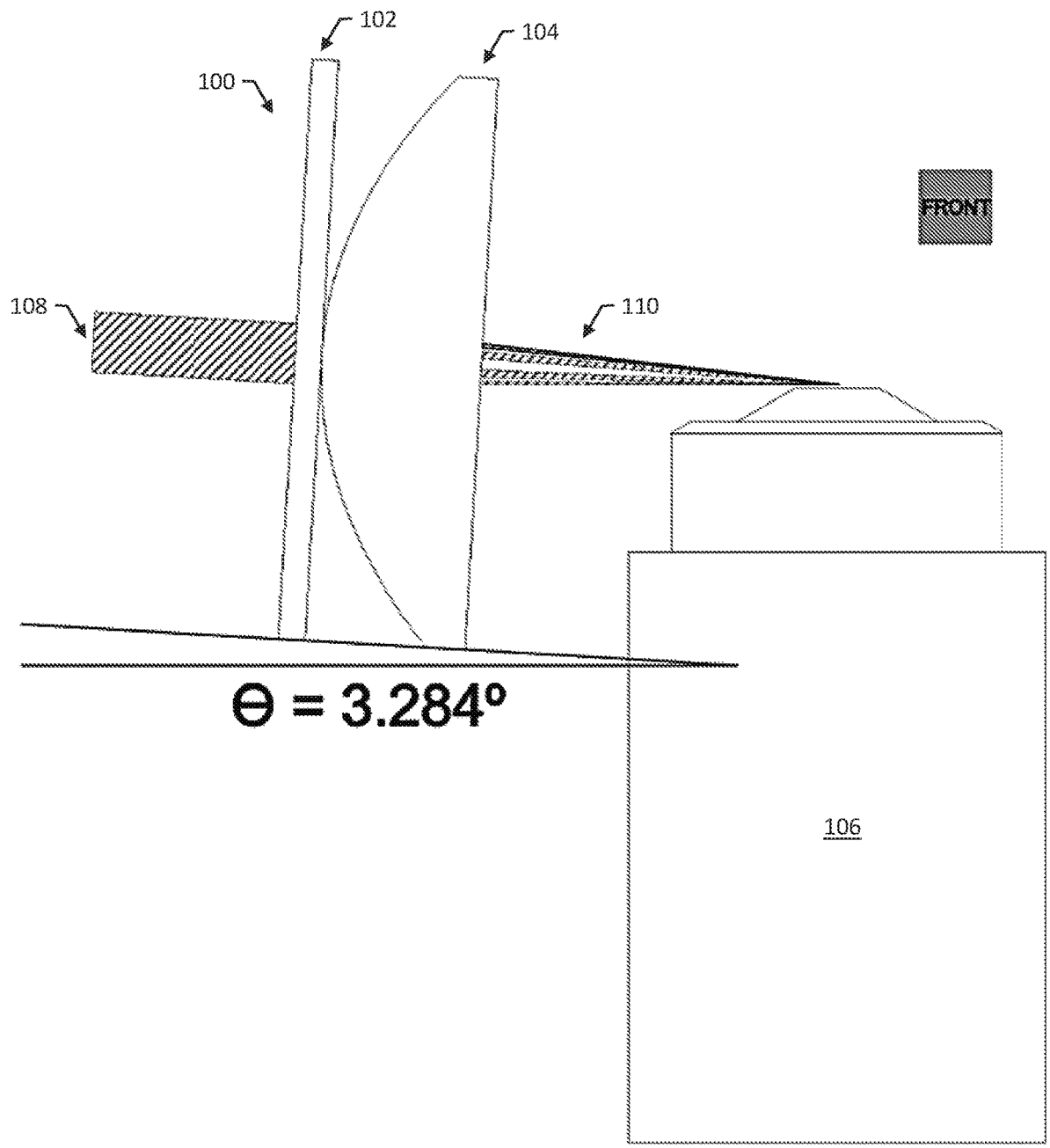
FIG. 3 shows a side angle of the example LITE sheet generation apparatus, collimated light and focused light, and the sample objective.

FIG. 3 shows a side angle of the example LITE sheet generation apparatus 100, collimated light 108 and focused light 110, and the sample objective 106. This view from the side highlights the tilt of the apparatus 100 and the light 108 relative to the imaging surface of the objective 106. Using the specific slit dimensions (shown in FIG. 4) and the NA of the cylindrical lens 104, $\theta$ is designed to be 3.284°, in order to match the half angle of the converging light 110. Designing $\theta$ in this way allows the converging light 110 to fully converge above the center of the field of view (FOV) in the objective 106 without the light being blocked. The bottommost portion of the converging light 110 is parallel to the imaging surface of the objective 106 while it is converging.

Figure 4:
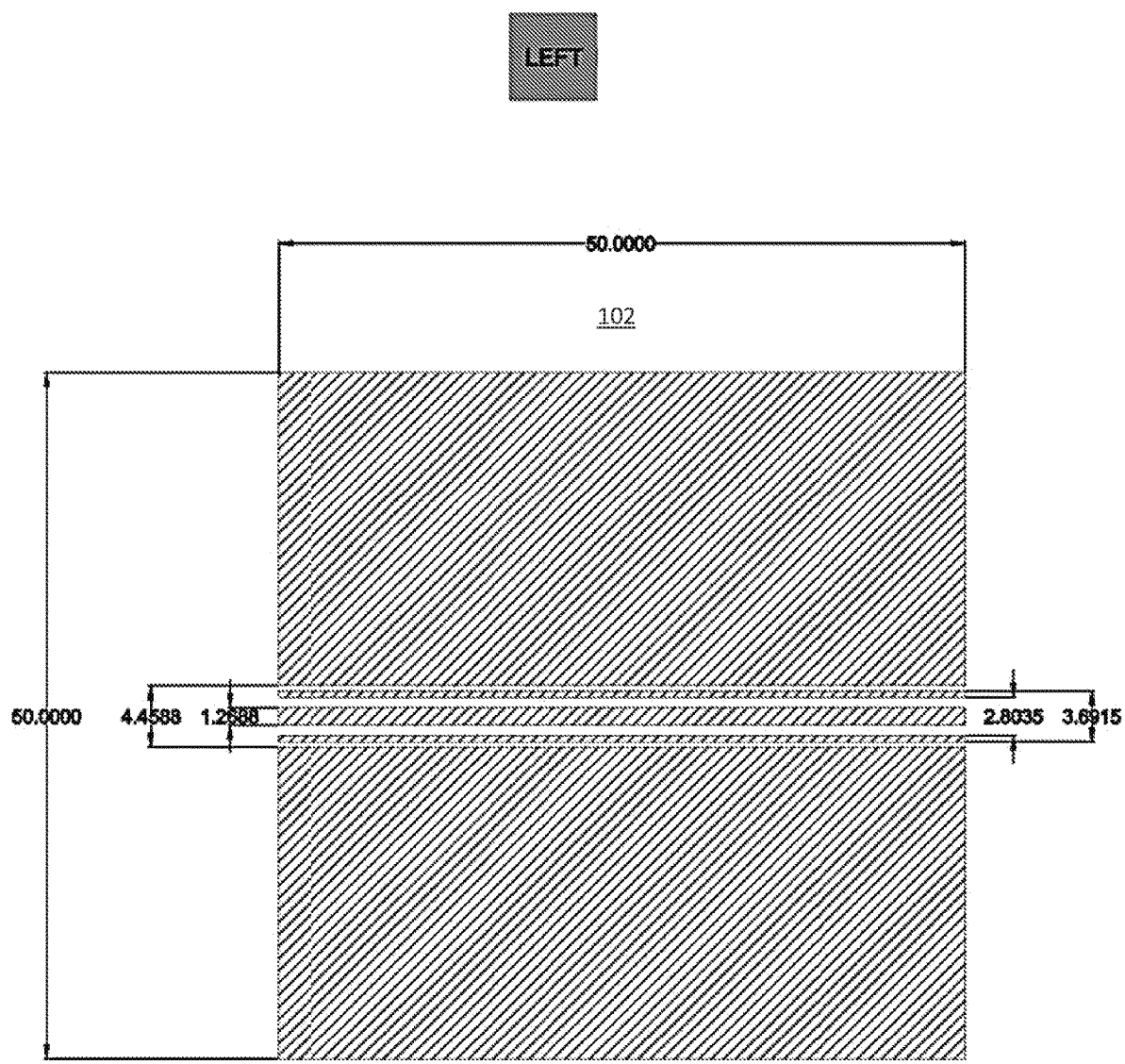
FIG. 4 shows a full en face view of the example photomask.

FIG. 4 shows a full en face view of the example photomask 102, highlighting the chrome (hatched) and clear (white) features. Dimensions shown are in mm. Generally, the photomask must have four clear slits that are arranged parallel to one another, orthogonal to the incident collimated laser, and parallel to the non-focusing axis of the cylindrical lens 104 in order to create an interfering, diffraction-limited light sheet at the focal line of the cylindrical lens. The widths and placement of the slits were adapted for the specifications of our cylindrical lens from Golub et al. in 2015 (Golub I, Chebbi B, and Golub J. (2015) "Toward the optical "magic carpet": reducing the divergence of a light sheet below the diffraction limit." *Opt. Lett.* 40 (21), 5121-24. Our example of the $1/e^2$ width of the laser 108 (5.2 mm) in FIG. 2 fills the full clear aperture of the photomask 102 (4.4588 mm). The clear substrate is fused silica, and the chrome surfaces are iron oxide.

Figure 5:
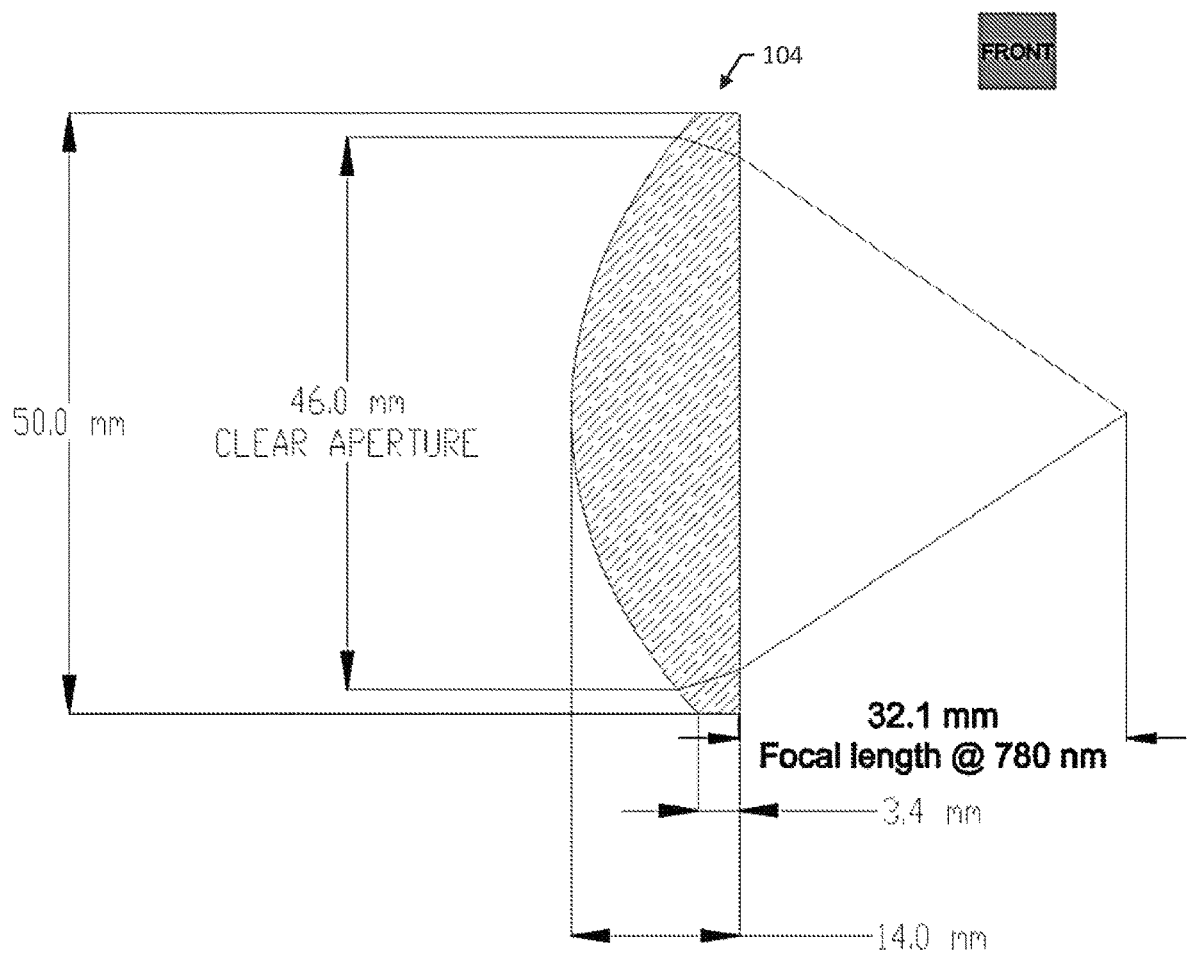
FIG. 5 shows a front view and dimensions of the example aspheric cylindrical lens used to focus the interference pattern produced from the photomask to a diffraction-limited line.

FIG. 5 shows a front view and dimensions of the example aspheric cylindrical lens 104 used to focus the interference pattern produced from the photomask 102 to a diffraction-limited line. This specific lens was designed and produced by ThorLabs (part number AYL5040-A). The glass used is S-LAH64 (n=1.777 at 780 nm), and the lens has a full NA of 0.50. This specific lens was used because of its large NA and its correction for spherical aberrations. This more accurately focuses the interference pattern in one dimension to a diffraction-limited sheet at the focal line of the lens.

Figure 6:
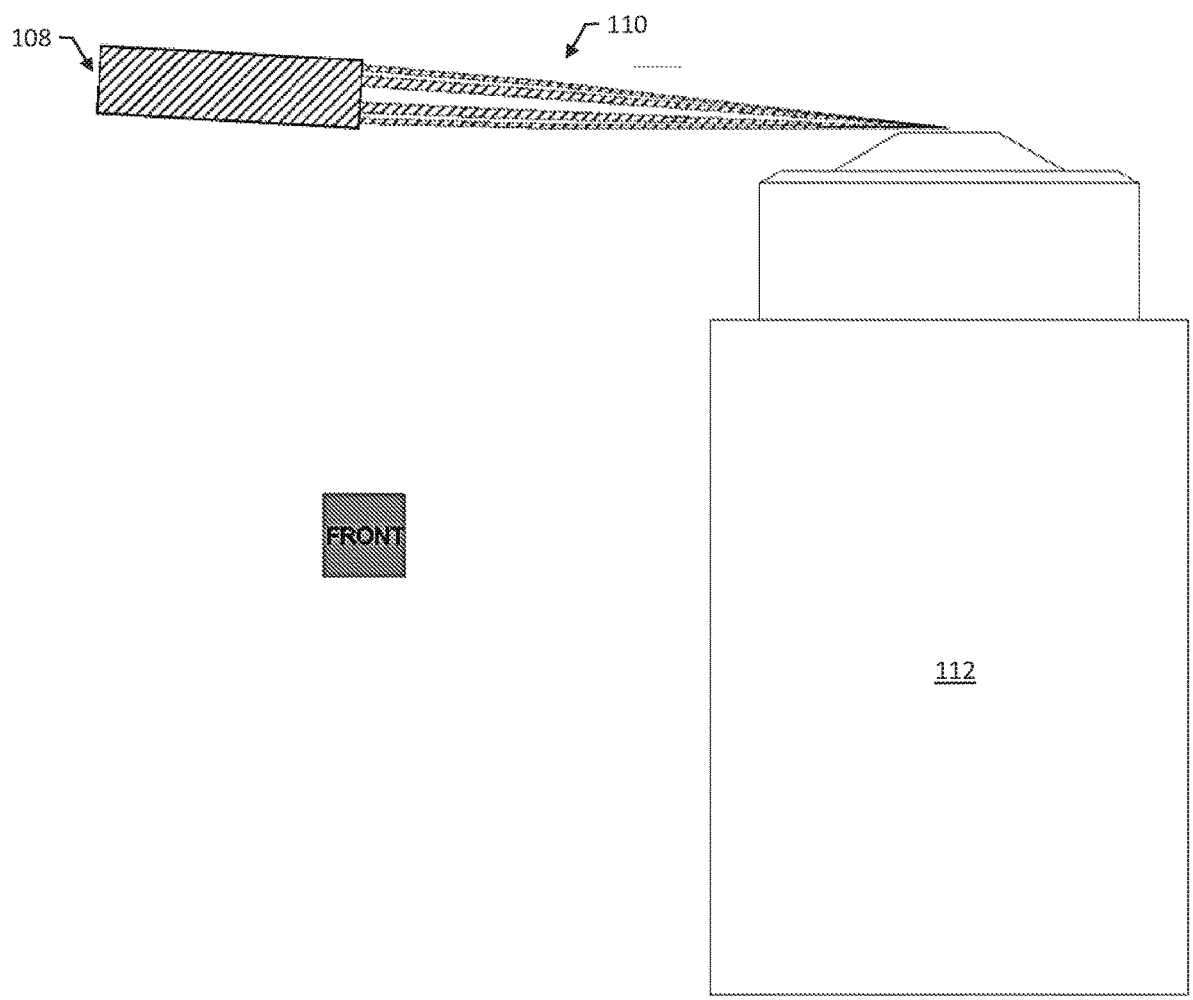
FIG. 6 shows a full, unobstructed side view of the example collimated and focused laser relative to the example microscope objective.

FIG. 6 shows a full, unobstructed side view of the example collimated 108 and focused 110 laser relative to the example microscope objective 106. Only the four zero-order diffraction beams are shown in the depiction of the converging light 110 in FIG. 6; however, their true vertical intensity profile is described in Golub et. al, 2015. Viewed from the side, the focused light sheet appears as a diffraction-limited spot.

Figure 7:
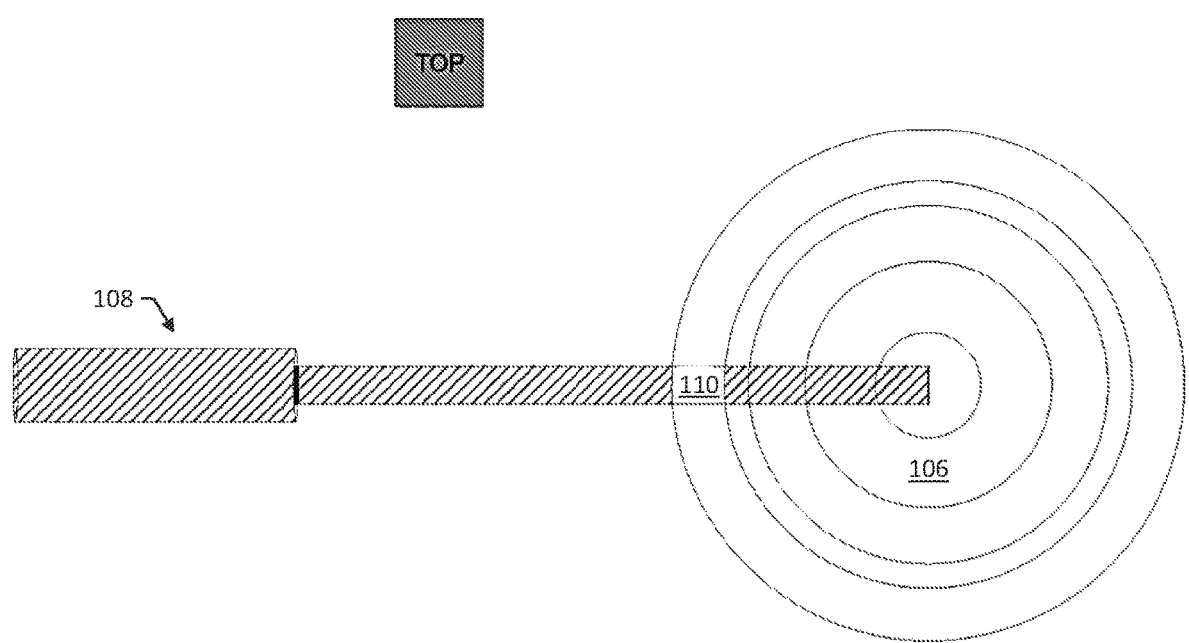
FIG. 7 shows a full, unobstructed top view of the collimated and focused laser relative to the example microscope objective.

FIG. 7 shows a full, unobstructed top view of the collimated 108 and focused 110 laser relative to the example microscope objective 106. Viewed from above, the focused light sheet appears as a diffraction-limited line.

Figure 8:
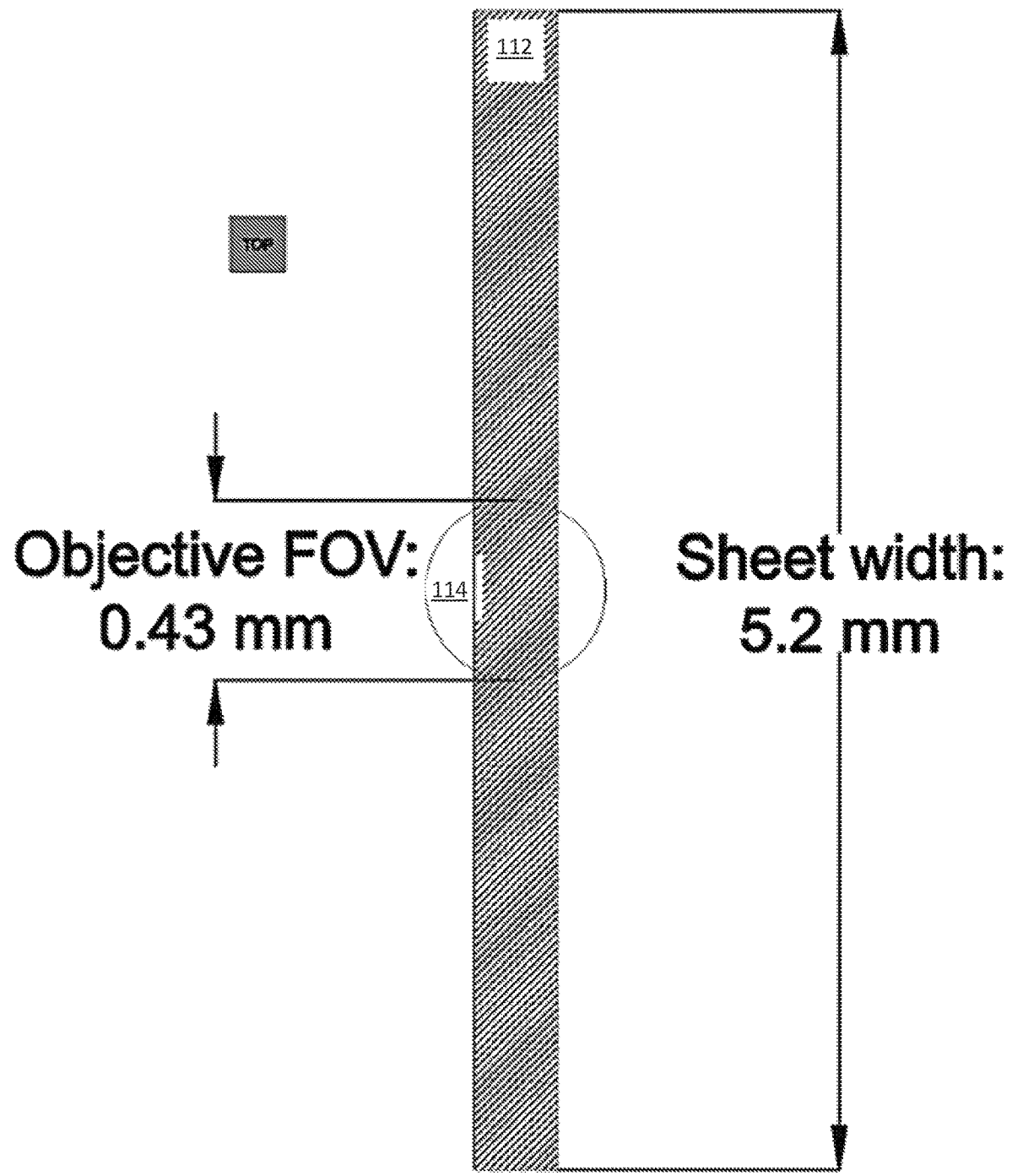
FIG. 8 shows a magnification of the top view in FIG. 7 to illustrate the dimensions of the example interfering, tilted light sheet relative to the FOV of the example objective.

FIG. 8 shows a magnification of the top view in FIG. 7 to illustrate the dimensions of the example interfering, tilted light sheet 112 relative to the FOV of the example objective 114. The objective 106 has a FOV of 0.430 mm in diameter. The laser 108 is only focused in one dimension, so its unfocused width (5.2 mm) remains constant and is determined by the $1/e^2$ width of the incident laser.

Figure 9:
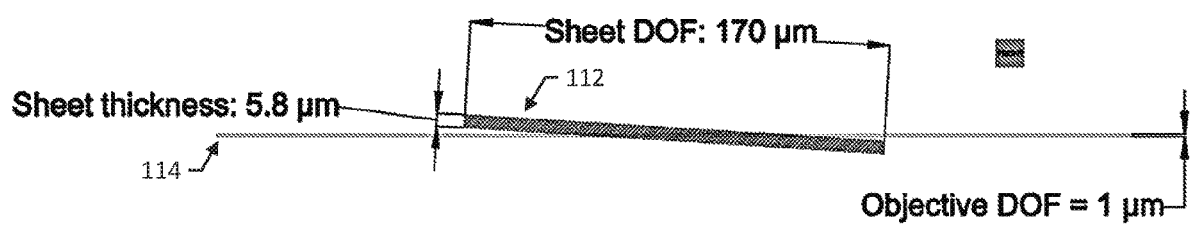
FIG. 9 shows a side view of the example tilted LITE sheet and the example objective FOV.

FIG. 9 shows a side view of the illustration in FIG. 7 (same magnification) of the example tilted LITE sheet 112 and the example objective FOV 114. The theoretical sheet thickness (5.8 µm) is diffraction-limited and was calculated according to the general lens formula: w=2nλ/(π·NA). The depth of field (DOF) of the interfering light sheet, which is the axial distance over which the sheet remains minimally thin and non-diffracting, is longer than that of a traditional gaussian beam focused solely through a cylindrical lens (~100 µm). This is due to the interference pattern generated from the photomask 102 pattern shown in FIG. 4. Despite the tilt of the sheet at the angle θ, the sheet still covers the center of the sample objective's FOV, allowing for light-sheet imaging of fluorescent samples mounted within any hypothetical microscope objective's FOV.

Figure 10:
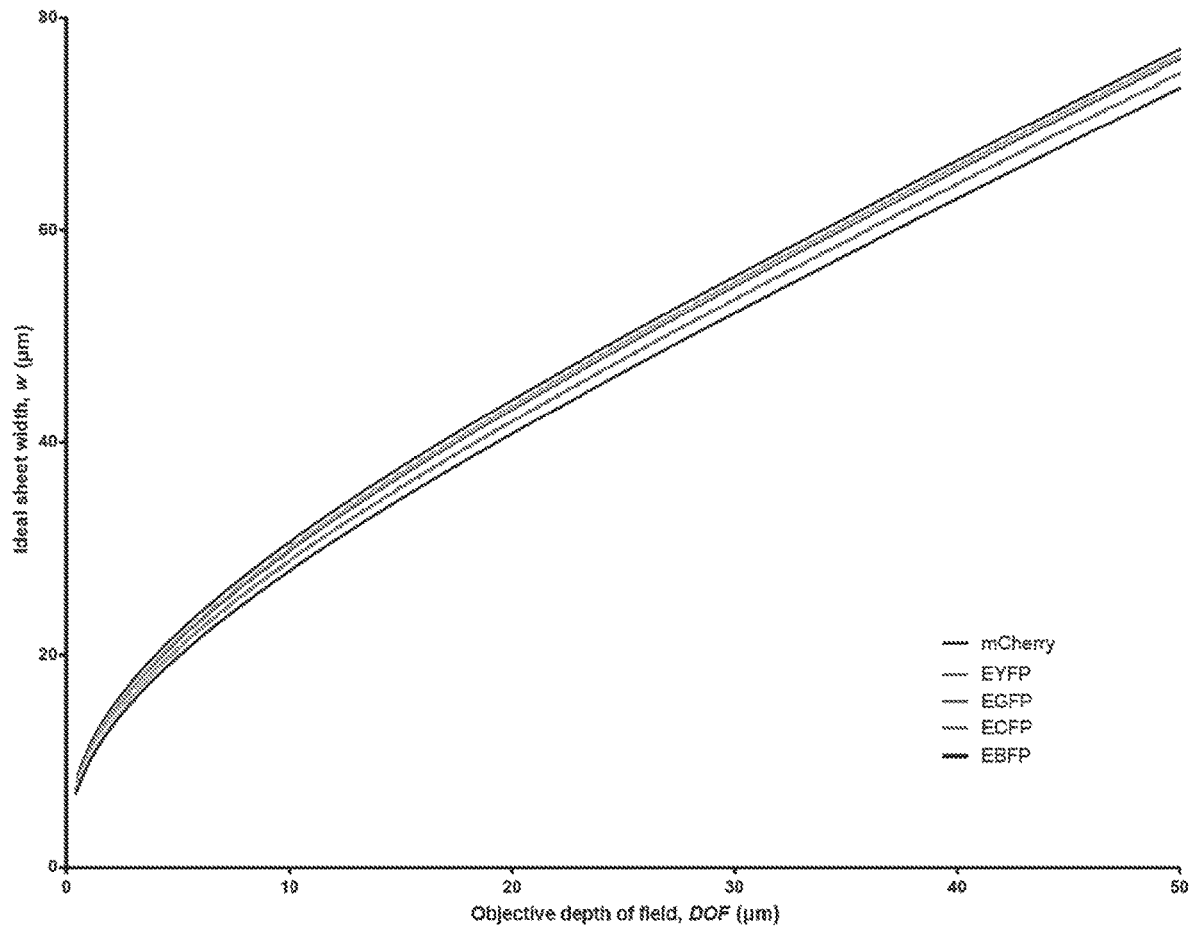
FIG. 10 is a graphical representation of the relationship between the depth of field (DOF) of the desired imaging objective and the ideal minimum width of the light sheet (w) to use LITE with that objective.

FIG. 10 is a graphical representation of the relationship between the depth of field (DOF) of the desired imaging objective and the ideal minimum width of the light sheet (w) to use LITE with that objective. Shown are five curves that correspond to five common fluorophores. The basic relationship is that sheet width increases with the depth of field of the objective in a non-linear fashion. With objectives with a DOF of greater than 10 µm, the relationship approaches a linear asymptote. More simply, with large DOF objectives, the ideal sheet width can more closely match the depth of field. A subset of this graph (0.4 µm<DOF<4 µm) in FIG. 11. Note that the DOF of an objective increases as the wavelength of the emitted light increases. Thus, it is necessary to form a thicker sheet to image fluorophores that emit longer wavelength photons. Theoretically, every DOF vs. w curve extends to the origin. However, we have plotted the curves beginning at their practical minima: as viewed from a 1.49 NA 100× oil immersion objective. The differences in these minima are highlighted in FIG. 11.

Figure 11:
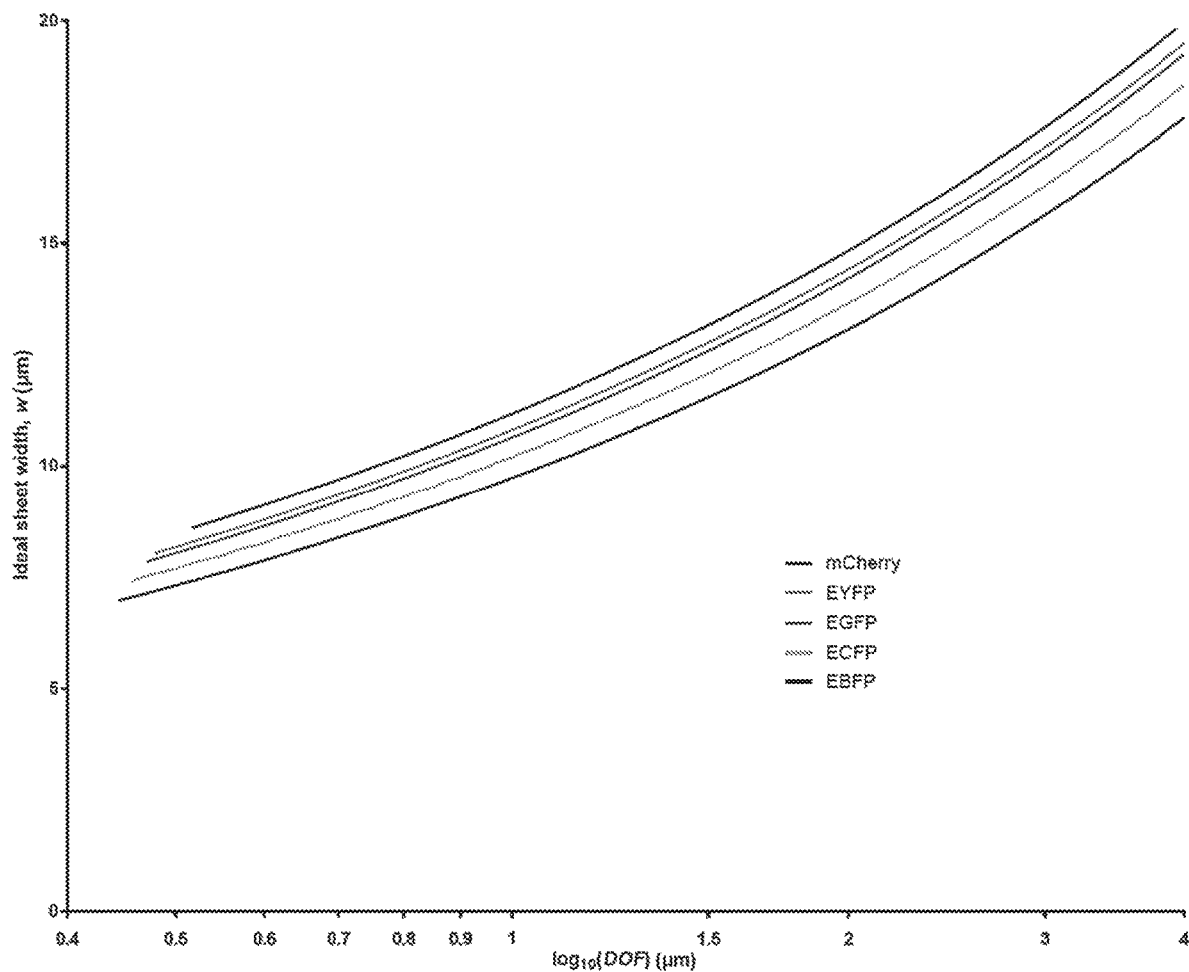
FIG. 11 is a subset of the graph of DOF vs. w in FIG. 11.

FIG. 11 is a subset of the graph of DOF vs. w in FIG. 11. DOF is plotted on a logarithmic scale in order to better highlight objectives with depths of field between 0.5 and 2 µm. The beginning of each curve is the practical minimum DOF (and their corresponding minimum sheet widths) for each of the sample fluorophores. We empirically define the practical minimum to be the depth of field of a 1.49 NA 100× oil immersion objective. From the first point on each curve, it is evident how both DOF and w change based on the different fluorophores.

Figure 12:
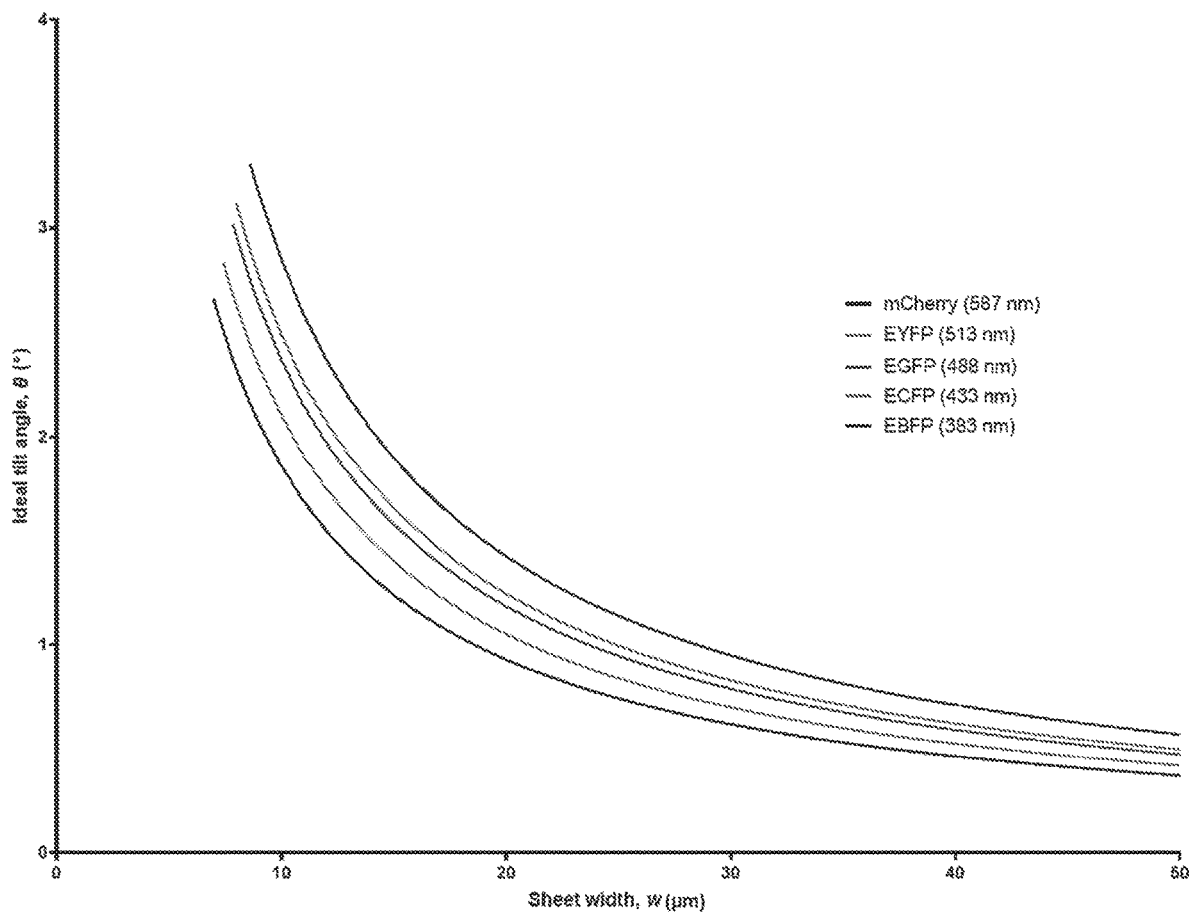
FIG. 12 shows a graphical relationship of ideal sheet width, w, and the corresponding tilt angle, $\theta$, needed in the LITE setup to generate a sheet of that width.

FIG. 12 shows a graphical relationship of ideal sheet width, w, and the corresponding tilt angle, θ, needed in the LITE setup to generate a sheet of that width. The graph in this figure is useful once the reader has identified the ideal width from FIGS. 10-11. Once w has been identified, use the graph in this figure to identify what the half angle of the converging light sheet will be. That half angle, θ, is the ideal angle with which to tilt the illumination path (relative to the surface of the objective; refer to FIG. 3). As in FIGS. 11-12, we have plotted five sample fluorophores and limited the curves to their practical minima. The wavelengths in parentheses in the figure legend correspond to the peak excitation wavelengths of the fluorophores.

Figure 13:
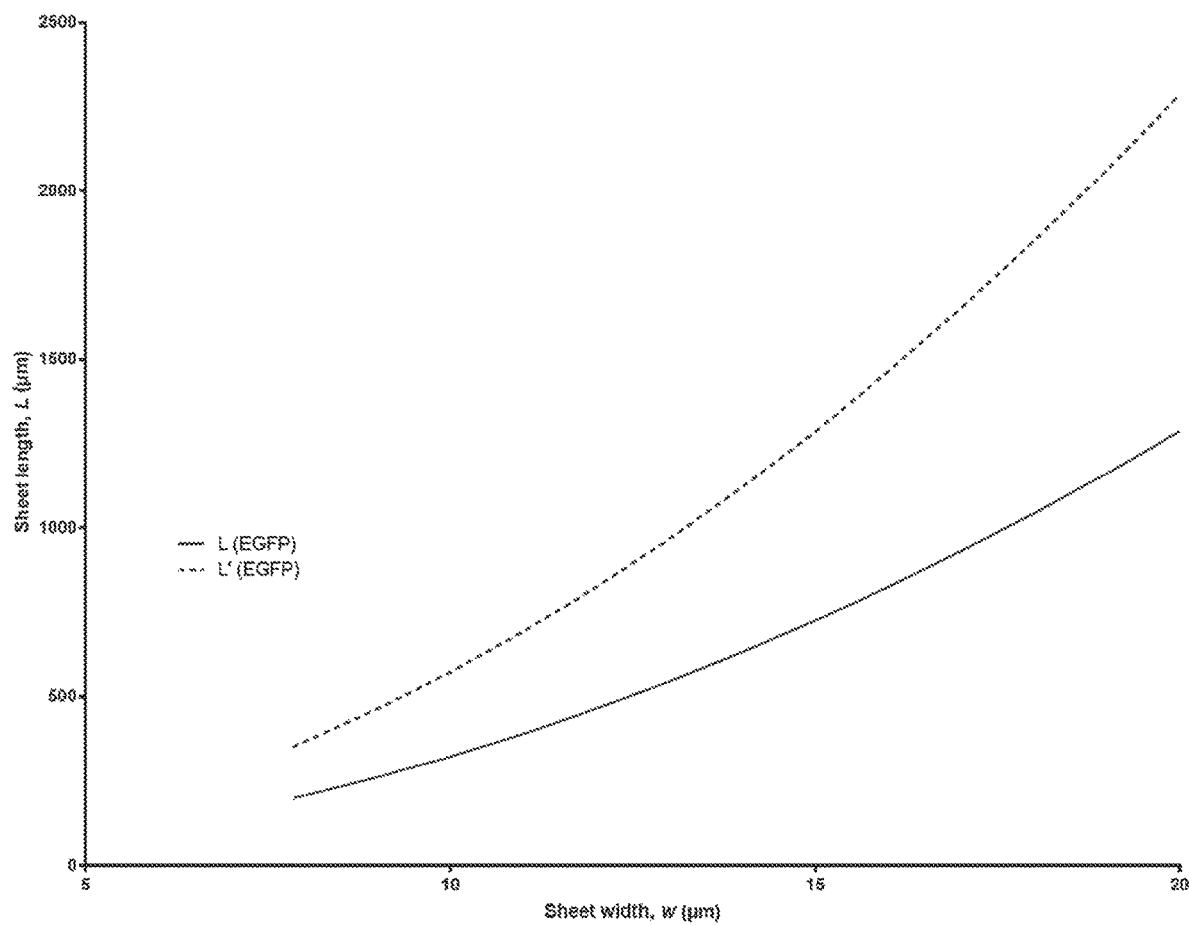
FIG. 13 shows a graphical relationship of sheet width to the non-diffracting sheet length.

FIG. 13 shows a graphical relationship of sheet width, w, to the non-diffracting sheet length, L. The graph in this figure shows how L increases exponentially with w. The two curves plotted represent the differences in the sheet lengths that are generated using only a cylindrical lens (L) and a cylindrical lens-photomask system (L'), as was first described in Golub et al. 2015. For simplicity, we only plot the sheet widths and lengths of a 488-nm laser, which we use to excite EGFP fluorophores in our example setup (FIGS. 1-9). Graphs of other wavelengths for different fluorophores follow the same trend: non-diffracting sheet length is increased through the generation of an interference pattern.

Figure 14A:
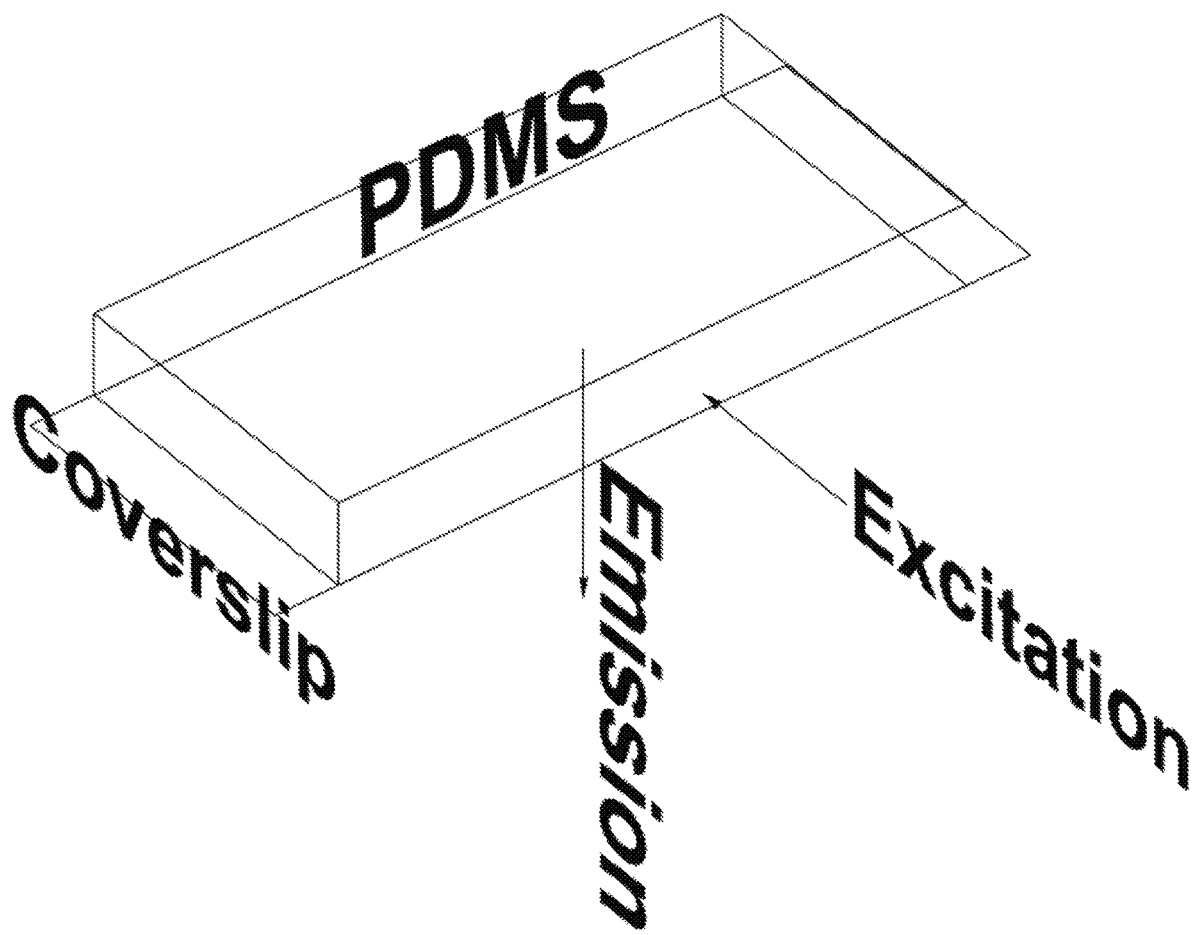
Figure 14B:
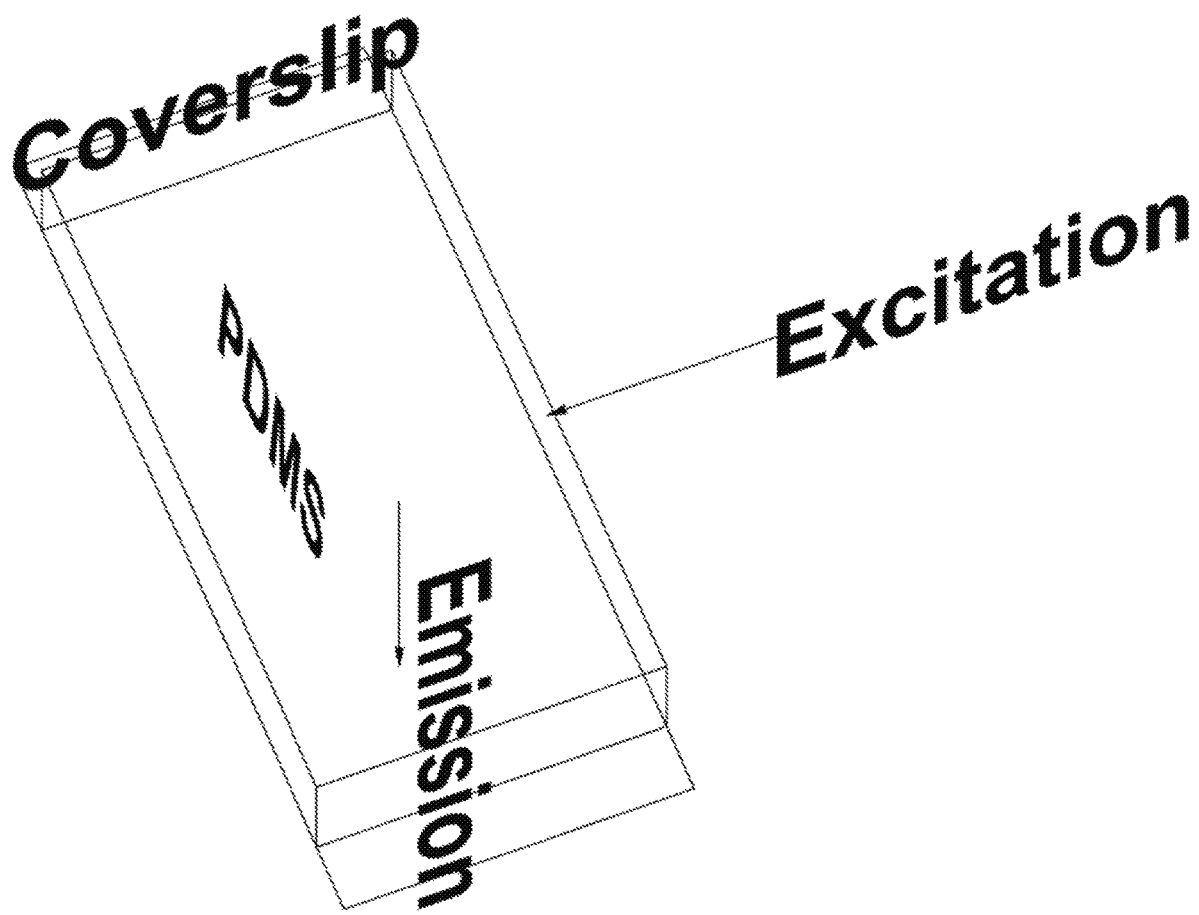
Figure 14C:
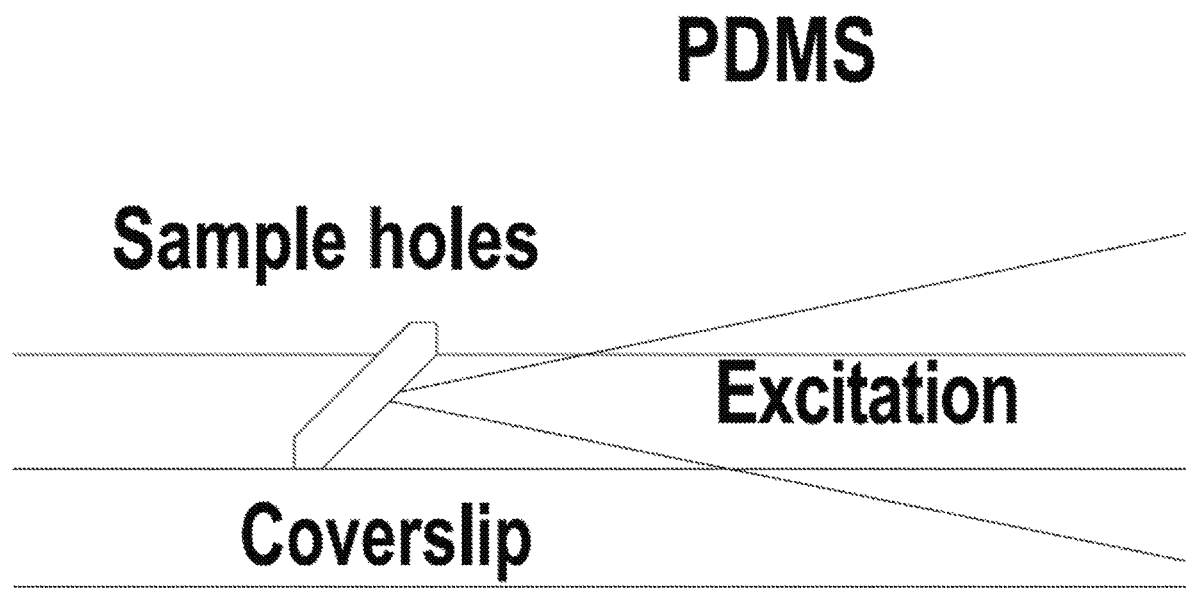

FIGS. 14A-C illustrate an example mounting chamber. The mounting chamber includes a glass coverslip, an array of horizontally-aligned holes in the glass coverslip each sized to receive a biological sample, and an optically clear substrate for covering the glass coverslip, the optically clear substrate having first and second flat surfaces perpendicular to each other. The holes can be any appropriate shape, e.g., cube-shaped. The optically clear substrate can be formed of any appropriate optically clear material, e.g., polydimethylsiloxane (PDMS). In general, any appropriate mounting chamber can be used with the fluorescence microscopy systems described in this specification, e.g., a water-filled, glass-walled chamber can be used.

FIG. 14A is a top view of the mounting chamber. The excitation light sheet is focused through the optically clear substrate through a first flat surface perpendicular to the glass coverslip. The emission fluorescence is directed away from the mounting chamber through a second flat surface parallel to the glass surface for imaging the sample. FIG. 14B is a bottom view of the mounting chamber. FIG. 14C is a closer view of the mounting chamber showing the array of holes. PDMS (polydimethylsiloxane) is an organic polymer used to create the example mounting chamber. PDMS is available from Corning.

Figure 15:
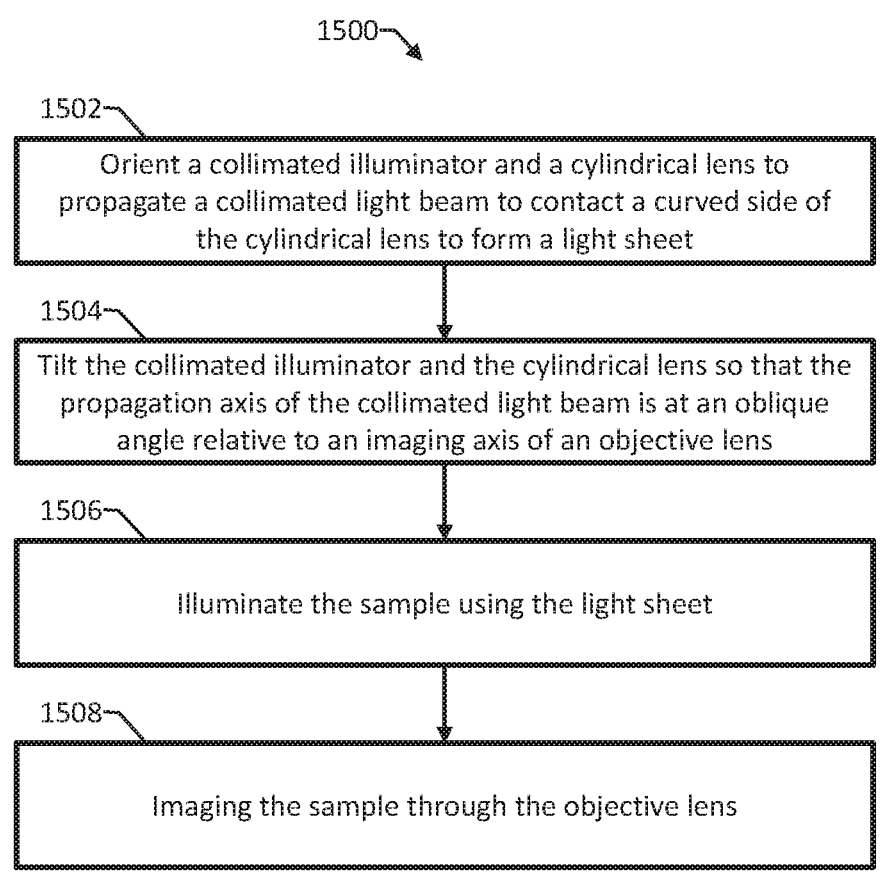
FIG. 15 is a flow diagram of an example method for imaging a sample using fluorescence microscopy.

FIG. 15 is a flow diagram of an example method 1500 for imaging a sample using fluorescence microscopy. The method 1500 includes orienting a collimated illuminator and a cylindrical lens to propagate a collimated light beam from the collimated illuminator along a propagation axis and to contact a curved side of the cylindrical lens to form a light sheet at a focal line of the cylindrical lens (1502). The method 1500 includes tilting the collimated illuminator and the cylindrical lens relative to an objective lens so that the propagation axis of the collimated light beam is at an oblique angle relative to an imaging axis of the objective lens 1504). The method 1500 includes illuminating a sample using the light sheet (1506). The method 1500 includes imaging the sample through the objective lens (1508).

In some examples, tilting the collimated illuminator and the cylindrical lens includes tilting the collimated illuminator and the cylindrical lens to a half angle of a converging light beam exiting the cylindrical lens so that a lowest part of the converging light beam propagates parallel to an imaging surface of the objective lens. The objective lens can have a numerical aperture greater than or equal to 1.4.

The method 1500 can include configuring the collimated illuminator and the cylindrical lens so that the light sheet is diffraction-limited over a field of view of the objective lens. Configuring the collimated illuminator and the cylindrical lens can include placing a photomask in a principle plane of the cylindrical lens between the collimated illuminator and the cylindrical lens. The photomask can include a quadruple-slit photomask shaped for elongating the diffraction-limited length of the light sheet by creating an interference pattern at the cylindrical lens focal line. The collimated illuminator comprises a laser source emitting a radially symmetric, Gaussian beam and a collimator. Orienting the collimated illuminator can include orienting the laser source and the collimator so that a beam waist of the radially symmetric, Gaussian beam is magnified by the collimator to a value that is equal to or greater than a full aperture of slits of the quadruple-slit photomask.

In some examples, imaging the sample includes observing the sample by eye or camera, using pre-existing light paths within a standard upright or inverted research-grade microscope. The method 1500 can include mounting the sample into one hole of an array of horizontally-aligned holes in a glass coverslip, covering the glass coverslip with an optically clear substrate having first and second flat surfaces perpendicular to each other, and placing the mounting chamber onto coverglass of the objective lens so that the first flat surface is parallel to the coverglass and the second flat surface is perpendicular to the coverglass.

1. Illumination

For the general LITE setup, a collimated illuminator is used to generate a radially symmetric, coherent beam with a gaussian intensity profile. We selected the Agilent Monolithic Laser Combiner 400 (MLC 400) with an FC/APC fiber-coupled laser output of four wavelengths (405, 488, 561, and 650 nm; other wavelengths and/or fiber optically coupled laser launches can be used). The four laser sources are solid state and pre-aligned to deliver a radially symmetric, coherent beam with a gaussian intensity profile. The maximum power outputs, after the fiber, of the four lasers in order of increasing wavelength are 18, 52, 55, and 37 mW. The rationale for this choice of illuminator is that the MLC 400 provides a pre-aligned mono-to-tetra-chromatic beam with wavelengths suitable for exciting various fluorophores in vivo. In addition, the output is fiber-coupled for safety, and the illuminator is analog-controllable via DAQ Board interface. For brevity, we mainly describe our setup as monochromatic at 488 nm excitation (for EGFP) in FIGS. 1-9.

2. Beam Conditioning

Illumination generally involves conditioning from the laser source such that the $1/e^2$ waist of the radially symmetric, gaussian beam is magnified to a value that is equal to or greater than the full aperture of the slits of the customized photomask (see below, Methods Part 3). The beam should generally remain collimated after conditioning. For our specific setup, we first collimate the laser output of our MLC 400 using an Achromatic FiberPort Collimator (purchased from ThorLabs, part number: PAFA-X-4-A). These optics collimate our diverging, fiber-coupled tetrachromatic beam to a $1/e^2$ waist of 0.65 mm. Because our photomask in Section 3 of Methods has an illuminating aperture of 4.4588 mm, we magnified our collimated beam to 8× of the original beam waist (5.2 mm) in order to completely fill the photomask. This magnification was done with a basic two-component telescopic lens system, consisting of two achromatic doublet lenses. The first lens (purchased from ThorLabs, part number: ThorLabs, part number: AC127-050-A-ML) is a 50-mm focal length, ½" mounted achromatic doublet with an anti-reflective coating of 400-700 nm (matching our range of illumination wavelengths). The second lens (purchased from ThorLabs, part number: Thor-Labs, part number: AC254-400-A-ML) is a 400-mm focal length, 1" mounted achromatic doublet with the same anti-reflective coating. Thus, our 0.65-mm diameter beam was spherically magnified by a factor of 8 to a 5.2-mm diameter beam by the ratio of the focal lengths of the two achromatic doublets. Precise care was taken to align the lens components along the propagation axis of the beam in order to maintain collimation upon exiting the telescopic system.

3. Photomask/Cylindrical Lens System

Traditionally, cylindrical lenses have been used in light sheet microscopy to focus a radially symmetric, collimated beam along one axis in order to approximate a non-diffracting "sheet" of light at the focal line of the cylindrical lens. The sheet itself (in the focal volume of the cylindrical lens) can be approximately defined as a rectangular prism with three dimensions: the thinnest, diffraction-limited vertical width (w) that the sheet reaches at the cylindrical lens focal line, the axial length (L) over which the sheet remains at its diffraction-limited width, and the unfocused horizontal breadth (b) of the sheet. Thus, the total light sheet volume is defined by the product of w·L·b.

The sheet width, w, is defined by the Equation 1:

$$w = \frac{2n \cdot \lambda}{\pi \cdot NA_{eff}}$$

In Equation 1, n is the refractive index of the medium in which the laser is focused to a sheet, λ is the wavelength of the laser (in μm), and $NA_{eff}$ is the effective numerical aperture of the cylindrical lens. Note that $NA_{eff}$ can be smaller than the reported NA of the cylindrical lens, as $NA_{eff}$ depends on the percentage of the cylindrical lens NA that is illuminated. Thus, w is inversely proportional to the diameter of the collimated beam incident to the cylindrical lens, assuming the beam diameter is less than the cylindrical lens NA. The thinnest sheet possible is preferable for fluorescence microscopy, for two reasons: to minimize out-of-focus excitation/emission events in the fluorescent sample and to prevent photobleaching and phototoxicity. However, the choice of sheet thickness is complicated by its mathematical entanglement with L, the sheet length, in Equation 2:

$$L = \frac{\pi \cdot w^2}{2\lambda}$$

From Equation 2, it is evident that L increases with the square of w. Equation 2 is plotted in FIG. 13. Practically, this means that the thinnest sheet possible is not necessarily the best sheet for imaging purposes, as the distance over which the sheet remains diffraction-limited will be too short to cover the field-of-view (FOV) of most microscope objectives used for detecting the signal. If the sheet begins to diffract over the FOV, then the illuminated slice of the fluorescent sample will vary in both thickness and intensity along the light path. This results in inconsistent emission of fluorophores, thus making quantitative analysis of fluorescent micrographs impossible.

In order to increase the L of a sheet of a given w, we placed a quadruple-slit photomask in the principle plane of the cylindrical lens, before the beam enters the lens. The theoretical design of these slits was described by Golub et al. in 2015 (Golub I, Chebbi B, and Golub J. (2015) "Toward the optical "magic carpet": reducing the divergence of a light sheet below the diffraction limit." *Opt. Lett.* 40 (21), 5121-24). In this paper, they describe a method for elongating the diffraction-limited length of a cylindrical lens-based light sheet by creating an interference pattern at the cylindrical lens focal line between two cosine waves. These two cosine waves are generated by the thin outer and thick inner horizontal slits of the photomask. In our setup, we have scaled the thickness of the Golub slits (which were designed for a cylindrical lens of a 152-mm focal length) to the scale of our selected 40-mm focal length, aspheric, cylindrical lens (purchased from ThorLabs, part number: AYL5040-A) which is suitable for light microscopy. The exact specifications of these slits are shown in FIG. 4. The optical trade-off of this interference setup is the generation of side lobes. Practically, this generates coplanar light sheets above and below the center peak of the main light sheet. However, the spacing of the slits was empirically chosen to keep more than 80% of the total laser energy in the center sheet. Thus, the sum of the side lobes accounts for less than 20% of the total energy.

In general, keeping the same scale of slit thickness to cylindrical lens focal length as is detailed in Golub et al. can be useful in order to keep the total central sheet energy above 80%. However, it is possible to further increase L while keeping w constant if more energy is diverted into the side lobes by decreasing the slit width. All data presented in FIGS. 10-13 is assuming an 80% central lobe energy.

As detailed in Golub et al., the following equations assume an 80% central lobe energy. Equation 3 details the modified interference sheet length as a function of sheet width:

$$L' = \frac{w^2 \pi^2}{2\lambda n^2}$$

The relationship between L' and w is graphed in FIG. 13, alongside L, which shows that L'>L at all w. For our specific setup, the photomask we use generates a sheet with a central lobe thickness of 5.8 μm and a length of 170 μm (FIG. 9).

4. Selection of Sheet Dimensions and Parameters

Because the sheet length and width are codependent, previous light sheet fluorescence microscopes have used standard (or custom) objective lenses to project a sheet of reduced size on the sample. This creates a geometry wherein users are restricted in their choice of imaging objectives to those with long enough working distance (greater than 1 mm) to focus on the sheet. One solution (mentioned above) uses micromirrors next to the sample to project a sheet on the focal plane that originates from the imaging objective. However, this arrangement is limited in the distance from the imaging objective—the sample can not be too close (e.g. on standard coverglass) or too far away from the imaging objective. Here, we present a novel solution for using virtually any existing microscope objective, including those with high NA, for imaging fluorescence signal from a light sheet. In order to decide which width and length of a light sheet to use for a preferred objective, we detail a step-by-step method for selecting the ideal setup of a LITE microscope illuminator based upon the desired objective.

In order to have a useful LITE setup, it is necessary to illuminate an objective's useful volume-of-view (VOV) while keeping illumination outside the VOV to a minimum. An objective's VOV can be defined by the product of the two-dimensional field-of-view (FOV) and the one-dimensional depth-of-field. FIG. 10 shows the relationship between the useful DOF of an objective and the ideal sheet width, w, for illuminating the entire useful imaging volume. We assume that the diameter of the useful FOV of an objective is ¼ of the full objective DOF, as the camera used to image the FOV only typically acquires the center quadrant of the objective FOV. The DOF of an objective is a set parameter that varies based on the NA and wavelength of the emitted fluorescence that is focused by the objective. Since the DOF is spectrally variable, parameter we plot the DOF at five emission wavelengths: 448, 475, 507, 527, and 610 nm, which correspond respectively to the peak emission wavelengths of EBFP, ECFP, EGFP, EYFP, and mCherry.

The relationship between DOF and w in FIG. 10 is derived from the necessity to project the light sheet closer to the coverglass surface as needed with high NA objectives, due to their short working distance. Practically speaking, the focal point of the interfering laser from the cylindrical lens is projected to be just over the surface of the cover glass. Using this logic, it is impossible to form a light sheet that is completely parallel to a high NA objective within its standard working distance (typically <300 um) while also projecting the converging beam over a flat surface, such as a coverslip. To solve this problem, LITE illumination tilts the collimated beam, photomask, and cylindrical lens relative to the surface of the objective (FIG. 3). Tilting in LITE is done at a precise, but customizable, angle (the half angle of the converging laser after exiting the cylindrical lens). Tilting the LITE setup at this half angle, θ, allows the lowest part of the converging beam to propagate parallel to the coverslip surface without interference from the coverslip.

Tilting a light sheet relative to the objective's FOV is not typical of other light sheet setups. However, if the tilting is kept to the minimum θ necessary to completely illuminate the FOV of interest, then out-of-focus excitation is still dramatically reduced (compared to conventional illumination) in the case of all objectives with a wide range of numerical apertures, magnifications, and depths of field. Determining the ideal θ is complicated by the dependence of w on the percentage of the cylindrical lens NA that is illuminated, which in turn determines θ. The full mathematical relationship of the maximum θ at which one should tilt a light sheet of dimensions L and w to fill the useful VOV of an objective (defined by useful FOV and DOF at the peak emission of the resultant excited fluorophores) is shown in Equation 4:

$$\theta = 2 \cdot \tan^{-1}\left[\frac{FOV - \sqrt{DOF^2 + FOV^2 - w^2}}{DOF + w}\right]$$

For sake of graphical simplicity, we approximated the mathematical dependence of DOF on FOV by an empirical plot of the reported values from a variety of commercially available objectives. In order to arrive at the w vs. DOF equation that is plotted in FIGS. 10-11, we substituted θ for its equivalent in terms of w, derived from the basic equation used to determine the diffraction-limited sheet width (Equation 5):

$$\theta = \sin^{-1}\left[\frac{2n\lambda}{\pi w}\right]$$

In order to calculate the ideal light sheet width based on the objective of choice, we explicitly derived the equation w=f(FOV, DOF, λ) shown below (Equation 6):

$$w = \sqrt{\frac{\left(\frac{1}{\sqrt{DOF^2 + FOV^2}}\right)\left(\frac{DOF^2}{2}\right)\sqrt{DOF^2 + FOV^2} + c_1(FOV)^2\lambda_{ex}\sqrt{1 + \frac{DOF^2}{FOV^2}} - c_2(\lambda_{ex})}{\sqrt{c_3(DOF)^6 + DOF^2 FOV^2\left(c_4\sqrt{1 + \frac{DOF^2}{FOV^2}}\sqrt{DOF^2 + FOV^2} - c_5(\lambda_{ex})\right) + DOF^4(c_3(FOV)^2 - c_5(\lambda_{ex})^2)}}}$$

$c_1 = 0.374781$, $c_2 = 0.00506606$, $c_3 = 97.4091$, $c_4 = 146.028$, $c_5 = 54.7287$

Constants in Equation 6 ($c_1$-$c_5$) are unchanging factors that result from the explicit derivation of w. Thus, we now have a function of two variables such that w=f(FOV, DOF). Five equations are plotted in FIG. 10 for the five fluorophores mentioned previously. A subset of the graph in FIG. 10 is shown in FIG. 11, with the x-axis plotted on a logarithmic scale to illustrate the effect that increasing DOF has on ideal sheet width at small DOF (and large NA). In this graph, we have plotted the empirical w=f(FOV, DOF, A) equations of each of the five example fluorophores beginning at the theoretical minimum DOF for each fluorophores at a 1.49 NA 100× oil immersion objective (Nikon), a practical lower limit of DOF for cell biologists. This lower limit on DOF corresponds to a minimal ideal sheet width for each fluorophore using the aforementioned objective. The graph in FIGS. 10 and 11 illustrates the usability of LITE with any fluorophore and any objective of any NA, from EBFP and a 1.49 NA 100× oil immersion objective (DOF=0.444 μm), or mCherry with a 0.1 NA 4× dry objective (DOF=65.0 μm). It is worth noting that the ideal width of an EBFP excitatory sheet with a 1.49 NA 100× is able to be generated using our aforementioned aspheric cylindrical lens (ThorLabs).

Once the ideal sheet width has been determined for the preferred objective, it is necessary to know what angle to tilt the LITE setup. The relationship between the ideal w and θ is plotted in FIG. 12. Again, five sample excitatory wavelengths are plotted for the sample fluorophores. Equation 5 details the exact mathematical relationship between w and θ.

5. Detection:

LITE imaging can be used to observe specimens by eye or camera, using the pre-existing light paths within a standard upright or inverted research grade microscope. For our prototype, we used either an interline CCD (CoolSnap HQ2, Photometrics) or sCMOS (Zyla 4.2, Andor). Images are "native" and require no interpolated rotation or further processing, as is the case for some other LSM solutions. In addition, all standard post-processing technologies are applicable, for instance, image deconvolution could be particularly useful to further increase the resolution.

Discussion

Here we present a microscope-independent LSM imaging solution that we term LITE. LITE imaging shares the benefits of other LSM: very low out-of-focus excitation, photobleaching, and phototoxicity, as well as rapid image acquisition. LITE diverges from other technologies by the use of high NA detection optics. High NA is beneficial for two major reasons: increased spatial resolution and detection efficiency (intensity). In addition, sample preparation in LITE imaging is simplified by allowing the user to mount directly onto coverglass. However, the illuminating path requires that the sheet forming beam enter an optically homogeneous material (of any form) through an optically unobstructed surface, so that the sheet is formed properly at the specimen (FIGS. 14A-C).

We have confirmed that LITE microscopy is compatible with a variety of fluorescent samples, including yeasts, *C. elegans*, human tissue culture cells, and cultured tobacco. From these tests, we have determined that a common LSM artifact, excitation shadowing, is also present in LITE imaging. However, shadowing can be mitigated greatly or removed altogether by using sample chambers that present the sample to the illuminating sheet without optical obstructions created by irregularities in the chamber wall or from other portions of the sample. Thus as with other LSM technologies, care should be taken to ensure that the excitation light path is unobstructed by specimens not in the FOV.

In sum, the LITE microscope is a new LSM solution designed by and for biologists from the specimen outward. We took two major constraints into account; specimen mounting and use of high NA detection objectives. To meet these criteria, sacrifices were made in the illuminating path, namely the sheet is tilted, resulting in slight "over illumination" of the FOV. In practice, we find that the gains provided by high NA and ease of sample mounting far outweigh the very slight increase in out-of-focus excitation.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for imaging a sample using fluorescence microscopy, the method comprising:
    orienting a collimated illuminator and a cylindrical lens to propagate a collimated light beam from the collimated illuminator along a propagation axis and to contact a curved side of the cylindrical lens to form a light sheet at a focal line of the cylindrical lens;
    tilting the collimated illuminator and the cylindrical lens relative to an objective lens so that the propagation axis of the collimated light beam is at an oblique angle relative to an imaging axis of the objective lens;
    illuminating a sample using the light sheet;
    configuring the collimated illuminator and the cylindrical lens so that the light sheet is diffraction-limited over a field of view of the objective lens; and
    imaging the sample through the objective lens.

2. The method of claim 1, wherein tilting the collimated illuminator and the cylindrical lens comprises tilting the collimated illuminator and the cylindrical lens to a half angle of a converging light beam exiting the cylindrical lens so that a lowest part of the converging light beam propagates parallel to an imaging surface of the objective lens.

3. The method of claim 1, wherein the objective lens has a numerical aperture greater than or equal to 1.4.

4. The method of claim 1, wherein configuring the collimated illuminator and the cylindrical lens comprises placing a photomask in a principle plane of the cylindrical lens between the collimated illuminator and the cylindrical lens.

5. The method of claim 4, wherein the photomask comprises a quadruple-slit photomask shaped for elongating the light sheet by creating an interference pattern at the cylindrical lens focal line.

6. The method of claim 5, wherein the collimated illuminator comprises a laser source emitting a radially symmetric, Gaussian beam and a collimator.

7. The method of claim 6, wherein orienting the collimated illuminator comprises orienting the laser source and the collimator so that a beam waist of the radially symmetric, Gaussian beam is magnified by the collimator to a value that is equal to or greater than a full aperture of slits of the quadruple-slit photomask.

8. The method of claim 1, wherein imaging the sample comprises observing the sample by eye or camera, using pre-existing light paths within a standard upright or inverted research-grade microscope.

9. The method of claim 1, comprising mounting the sample into one hole of an array of horizontally-aligned holes in a glass coverslip, covering the glass coverslip with an optically clear substrate having first and second flat surfaces perpendicular to each other to form a mounting chamber, and placing the mounting chamber onto a coverglass of the objective lens so that the first flat surface is parallel to the coverglass and the second flat surface is perpendicular to the coverglass.

10. A system for imaging a sample using fluorescence microscopy, the system comprising:
   a collimated illuminator configured to propagate a collimated light beam along a propagation axis;
   a cylindrical lens in a path of the collimated light beam along the propagation axis, wherein the cylindrical lens is shaped to form a light sheet from the collimated light beam at a focal line of the cylindrical lens; and
   an objective lens comprising an imaging surface;
   wherein the collimated illuminator and cylindrical lens are titled relative to the objective lens so that the propagation axis of the collimated light beam is at an oblique angle relative to an imaging axis of the objective lens;
   wherein the collimated illuminator and the cylindrical lens are tilted to a half angle of a converging light beam exiting the cylindrical lens so that a lowest part of the converging light beam propagates parallel to an imaging surface of the objective lens;
   wherein the system comprises a photomask in a principle plane of the cylindrical lens between the collimated illuminator and the cylindrical lens.

11. The system of claim 10, wherein the photomask comprises a quadruple-slit photomask shaped for elongating the light sheet by creating an interference pattern at the cylindrical lens focal line.

12. The system of claim 11, wherein the collimated illuminator comprises a laser source emitting a radially symmetric, Gaussian beam and a collimator, and wherein the laser source and the collimator are configured so that the that a beam waist of the radially symmetric, Gaussian beam is magnified by the collimator to a value that is equal to or greater than a full aperture of the slits of the quadruple-slit photomask.

13. An illumination system for a fluorescence microscope, the illumination system comprising:
   a cylindrical lens shaped to form a light sheet from a collimated light beam at a focal line of the cylindrical lens;
   a photomask shaped for elongating a diffraction limited length of the light sheet by creating an interference pattern at the cylindrical lens focal line;
   a structure for tilting the cylindrical lens and the photomask relative to an imaging axis of objective lens so that a propagation axis of the collimated light beam is at an oblique angle relative to the imaging axis of the objective lens for tilted illumination of a sample; and
   a collimated illuminator configured to propagate the collimated light beam along the propagation axis, wherein the structure is configured for tilting the collimated illuminator with the cylindrical lens and the photomask;
   wherein the photomask comprises a quadruple-slit photomask.

14. The illumination system of claim 13, wherein the cylindrical lens comprises an aspheric cylindrical lens.

15. The illumination system of claim 13, comprising a mounting chamber for the sample, the mounting chamber comprising a coverslip and an optically clear substrate for covering the coverslip.

* * * * *